(12) United States Patent
Woodfield et al.

(10) Patent No.: US 7,531,021 B2
(45) Date of Patent: May 12, 2009

(54) ARTICLE HAVING A DISPERSION OF ULTRAFINE TITANIUM BORIDE PARTICLES IN A TITANIUM-BASE MATRIX

(75) Inventors: Andrew Philip Woodfield, Cincinnati, OH (US); Eric Allen Ott, Cincinnati, OH (US); Clifford Earl Shamblen, Blue Ash, OH (US)

(73) Assignee: General Electric Company, Schenectady, NY (US)

( * ) Notice: Subject to any disclaimer, the term of this patent is extended or adjusted under 35 U.S.C. 154(b) by 289 days.

(21) Appl. No.: 11/140,662

(22) Filed: May 27, 2005

(65) Prior Publication Data

US 2006/0102255 A1 May 18, 2006

Related U.S. Application Data

(63) Continuation-in-part of application No. 10/987,887, filed on Nov. 12, 2004.

(60) Provisional application No. 60/640,072, filed on Dec. 29, 2004.

(51) Int. Cl.
 *B22F 3/00* (2006.01)
(52) U.S. Cl. .............................. 75/244; 75/232; 75/245
(58) Field of Classification Search .................. 75/232, 75/244, 245
 See application file for complete search history.

(56) References Cited

U.S. PATENT DOCUMENTS

| | | | |
|---|---|---|---|
| 2,799,570 A | | 7/1957 | Reed et al. |
| 2,828,199 A | | 3/1958 | Findlay |
| 3,052,538 A | * | 9/1962 | Jech et al. ..................... 75/238 |
| 3,449,115 A | | 6/1969 | Glamiche et al. |
| 3,622,406 A | * | 11/1971 | Vordahl ....................... 148/401 |
| 3,736,132 A | | 5/1973 | Easterday et al. |
| 3,802,850 A | | 4/1974 | Clougherty |
| 3,909,247 A | | 9/1975 | Paris et al. |
| 4,282,195 A | | 8/1981 | Hoekje |
| 4,353,885 A | * | 10/1982 | Hoekje ........................ 423/289 |
| 4,373,947 A | | 2/1983 | Buttner et al. |
| 4,519,839 A | | 5/1985 | Toyoaki et al. |
| 4,525,206 A | | 6/1985 | Soled et al. |
| 4,687,632 A | | 8/1987 | Hurd et al. |
| 4,731,111 A | | 3/1988 | Kopatz et al. |
| 4,820,339 A | | 4/1989 | Bienvenu et al. |
| 4,894,086 A | | 1/1990 | Huether et al. |
| 4,906,430 A | * | 3/1990 | Abkowitz et al. ............... 419/6 |
| 4,906,436 A | | 3/1990 | Gigliotti et al. |
| 4,915,905 A | * | 4/1990 | Kampe et al. ................ 420/418 |
| 4,999,336 A | | 3/1991 | Nadkarni et al. |
| 5,032,176 A | | 7/1991 | Kametani et al. |
| 5,322,666 A | | 6/1994 | Watwe |
| 5,779,761 A | | 7/1998 | Armstrong et al. |
| 5,830,288 A | | 11/1998 | Gigliotti et al. |
| 5,930,580 A | | 7/1999 | Everett |
| 5,958,106 A | | 9/1999 | Armstrong et al. |
| 6,036,742 A | | 3/2000 | Schiegel et al. |
| 6,099,664 A | | 8/2000 | Davies et al. |
| 6,117,204 A | | 9/2000 | Saito et al. |
| 6,152,982 A | | 11/2000 | Froes et al. |
| 6,264,719 B1 | | 7/2001 | Zhang et al. |
| 6,409,794 B2 | | 6/2002 | Wolmer et al. |
| 6,540,811 B2 | | 4/2003 | Hosoe et al. |
| 6,551,371 B1 | | 4/2003 | Furuta et al. |
| 6,582,651 B1 | | 6/2003 | Cochran, Jr. et al. |
| 6,635,098 B2 | | 10/2003 | Abkowitz et al. |
| 6,663,763 B2 | | 12/2003 | Lazar et al. |
| 6,737,017 B2 | | 5/2004 | Woodfield et al. |
| 6,921,510 B2 | * | 7/2005 | Ott et al. ....................... 419/10 |
| 2002/0068005 A1 | | 6/2002 | Meyer et al. |
| 2002/0073804 A1 | | 6/2002 | Meis |
| 2003/0205108 A1 | | 11/2003 | Hong et al. |
| 2003/0230170 A1 | | 12/2003 | Woodfield et al. |
| 2003/0231974 A1 | | 12/2003 | Woodfield et al. |
| 2004/0050208 A1 | | 3/2004 | Nie et al. |
| 2004/0084323 A1 | | 5/2004 | Strezov et al. |
| 2004/0123700 A1 | | 7/2004 | Zhou et al. |
| 2004/0261573 A1 | | 12/2004 | Zhou et al. |

FOREIGN PATENT DOCUMENTS

| | | |
|---|---|---|
| DE | 11 29 710 B | 5/1962 |
| EP | 0751228 | 1/1997 |
| EP | 0 728 223 B1 | 8/1997 |
| EP | 0997544 | 5/2000 |

(Continued)

OTHER PUBLICATIONS

Flow and Creep Behavior of Ti/TiB In-situ Composites, J.A. Philliber, F.C. Dary, F.W. Zok and C.G. Levi, Titanium '95: Science and Technology, XP-002359921.

(Continued)

*Primary Examiner*—Roy King
*Assistant Examiner*—Ngoclan T Mai
(74) *Attorney, Agent, or Firm*—McNees Wallace & Nurick, LLC

(57) ABSTRACT

An article includes a microscale composite material having a matrix with more titanium than any other element, and a dispersion of titanium boride particles in the matrix. At least about 50 volume percent of the titanium boride particles have a maximum dimension of less than about 2 micrometers.

31 Claims, 4 Drawing Sheets

FOREIGN PATENT DOCUMENTS

| | | |
|---|---|---|
| EP | 1 018 386 A1 | 12/2000 |
| EP | 1101831 | 5/2001 |
| EP | 1295955 | 3/2003 |
| GB | 883 429 A | 11/1961 |
| JP | 01 184203 A | 10/1989 |
| JP | 05078762 | 3/1993 |
| JP | 2002003977 | 9/2002 |
| WO | WO 99/64638 | 12/1999 |
| WO | WO 00/76698 A1 | 12/2000 |

OTHER PUBLICATIONS

Sintering Behavior and Thermal Stability of a TiB Particle Reinforced PM Beta-Titanium Matrix Composite, T. Saito, T. Furuta and H. Takamiya, Titanium '95: Science and Technology, XP-002359923.

Comparison of Microstructural Evolution in Laser-Deposited and Arc-Melted In-Situ Ti-TiB Composites, R. Banerjee, A. Genc, P.C. Collins, and H.L. Fraser, Metallurgical and Materials Transactions, vol. 35A, Jul. 2004, XP-009059122.

In-situ-reinforced titanium matrix composites, M.S. Thompson and V.C. Nardone, Materials Science and Engineering, A144 (1991) 121-126, XP-002359920.

Powder Metallurgy Ti-6A1-4V-xB Allo, Journal of Medicine, May 2004.ys: Processing, Microstructure, and Properties, S. Tamirisakandala, R.B. Bhat, V.A. Ravi and D.B. Miracle, Member Journal of the Minerals, Metals & Materials Society, May 2004.

CermeTi Discontinuously Reinforced Ti-Matrix Composites: Manufacturing, Properties, and Applications, Stanley Abkowitz, Susan M. Abkowitz, Harvey Fisher and Patricia J. Schwartz, Member Journal of the Minerals, Metals & Materials Society, May 2004.

High-Temperature Deformation Behavior of Ti-TiB in-Situ Metal-Matrix Composites, Sweety Kumari, N. Eswara Prasad, K.S. Ravi Chandran and G. Malakondaiah, Member Journal of the Minerals, Metals & Materials Society, May 2004.

The Prospects for Hybrid Fiber-Reinforced Ti-TiB-Matrix Composites, W. Hanusiak, C.F. Yolton, J. Fields, V. Hammong, and R. Grabow, W. Hanusiak, C.F. Yolton, J. Fields, V. Hammond, and R. Gravow, Member Journal of the Minerals, Metals & Materials Society, May 2004.

TiB—Reinforced Ti Composites: Processing, Properties, Application Prospects, and Research Needs, K.S. Ravi Chandran, K. B.I Panda, and S.S. Sahay, Member Journal of the Minerals, Metals & Materials Society, May 2004.

Titanium-Boron Alloys and Composites: Processing, Properties, and Applications, K.S. Ravi Chandran and Daniel B. Miracle, Member Journal of the Minerals, Metals & Materials Society, May 2004.

The Pre-Alloyed Powder Metallurgy of Titanium with Boron and Carbon Additions, C.F. Yolton, Member Journal of the Minerals, Metals & Materials Society, May 2004.

The Automotive Application of Discontinuously Reinforced TiB-Ti Composites, Takashi Saito, Member Journal of the Minerals, Metals & Materials Society, May 2004.

Matthew J. Donachie, Jr: "Titanium (A Technical Guide"), ASM International, USA XP 002253129, p. 47-p. 51.

Doyle, Eoghan T.M. et al. "Carbothermic reduction of nickel-cobalt-chromium oxide mixture for the production of NiCoCr superalloy powder" EPD CONGR. 1992, Proc. Symp. TMS Annu. Meet., 745-58. Editor(s): Hager, John P.; Publisher: Miner. Met. Mater. Soc., Warrendale, PA. Coden: 58HHA7, 1992, XP0009029023.

D. Hull and D.J. Bacon, "Introduction to Disclocations", Pergamon Press, 1984, pp. 204-207.

* cited by examiner

ARTICLE HAVING A DISPERSION OF ULTRAFINE TITANIUM BORIDE PARTICLES IN A TITANIUM-BASE MATRIX

This application is a continuation in part of application Ser. No. 10/987,887, filed Nov. 12, 2004, for which priority is claimed and whose disclosure is incorporated by reference. This application claims the benefit of U.S. Provisional Application No. 60/640,072, filed Dec. 29, 2004, the disclosure of which is hereby incorporated herein by reference.

This invention relates to articles having titanium-base metallic compositions and, more particularly, to articles made of titanium-base compositions having titanium boride particles dispersed therein.

BACKGROUND OF THE INVENTION

One of the most demanding applications of materials in aircraft gas turbine engines is compressor and fan disks (sometimes termed "rotors") upon which the respective compressor blades and fan blades are supported. The disks rotate at many thousands of revolutions per minute, in a moderately elevated-temperature environment, when the gas turbine is operating. They must exhibit the required mechanical properties under these operating conditions.

Some of the gas turbine engine components, such as some of the compressor and fan disks, are fabricated from titanium metallic compositions. The disks are typically manufactured by furnishing the metallic constituents of the selected titanium metallic composition, melting the constituents, and casting an ingot of the titanium metallic composition. The cast ingot is then converted into a billet. The billet is further mechanically worked, typically by forging. The worked billet is thereafter upset forged, and then machined to produce the titanium-base metallic composition component.

Achieving the required mechanical properties at room temperature and up to moderately elevated temperatures, retaining sufficient environmental resistance, and preventing premature failure offer major challenges in the selection of the materials of construction and the fabrication of the articles. The chemistry and microstructure of the metallic composition must ensure that the mechanical properties of the article are met over the service temperature range of at least up to about 1200° F. for current titanium-base metallic composition components. The upper limit of about 1200° F. for service of such components is due principally to static-strength and creep-strength reduction at higher temperatures and the tendency for titanium to react with oxygen at elevated temperatures, forming a brittle oxygen-enriched layer, termed alpha case. Small mechanical or chemical irregularities in the final component may cause it to fail prematurely in service, and these irregularities must be minimized or, if present, be detectable by available inspection techniques and taken into account. Such irregularities may include, for example, mechanical irregularities such as cracks and voids, and chemical irregularities such as hard alpha irregularities (sometimes termed low-density inclusions) and high-density inclusions.

One recent approach to improving the properties of titanium-base metallic compositions, including the high-temperature strength, is the introduction of boron into the metallic composition to produce titanium boride particles dispersed therein. The introduction of boron has been accomplished by several different methods, such as conventional cast-and-wrought processing, powder metallurgy techniques such as gas atomization, and a blended elemental approach. The first two methods suffer from the limited solubility of boron in titanium. The boron tends to segregate strongly, forming relatively large titanium boride particles that are detrimental to ductility and fatigue. In order to avoid the segregation problem, the levels of boron added to the metallic composition by these first two methods is severely restricted, usually to the hypoeutectic portion of the phase diagram, limiting the potential benefits of the boron addition, or the cooling rate during solidification must be very high. The blended elemental approach allows much larger additions of boron. However, because the boron is typically added as titanium diboride, and the phase in thermodynamic equilibrium with the alpha phase of titanium is the very-stable titanium monoboride, extended times at elevated temperatures are required to fully convert the titanium diboride to titanium monoboride. The required high temperatures and long times prevent the production of a uniform fine dispersion of titanium boride particles in the metallic composition. Additionally, fine freestanding titanium boride or titanium diboride particles tend to agglomerate, reducing the uniformity of the final product. The result of all of these production approaches is that a significant volume fraction of the titanium boride is present as large particles that are typically 10-100 micrometers in their largest dimensions. These large particles have some beneficial strengthening effects, but they are not optimal for ductility, crack initiation, and static, creep, and fatigue strength.

It has been possible, using existing melting, casting, and conversion practice, to prepare non-boron-containing titanium-base metallic composition components such as compressor and fan disks that are fully serviceable. However, there is a desire and need for a manufacturing process to produce the disks and other components with even further-improved properties arising from the presence of titanium boride particles and greater freedom from irregularities, thereby improving the operating margins of safety. The present invention fulfills this need for an improved process, and further provides related advantages.

SUMMARY OF THE INVENTION

The present approach provides a metallic article of a titanium-base composition that also contains boron in an amount greater than the solubility limit of the boron in the metallic composition. The intragranular titanium boride particles distributed in the titanium matrix are small in size, typically well below 1 micrometer in their largest dimensions. The article has a good combination of mechanical properties in the temperature range up to about 1300° F., possible good resistance to environmental damage from oxidation, and a low incidence of irregularities. The elastic modulus of the material is improved and the wear resistance is increased by the presence of the titanium boride particles. The boride dispersion is more uniform and far finer than that resulting from other production techniques. The material produced by the present approach has better static and creep strength at the same operating temperatures as compared with conventional titanium metallic compositions, and also allows the material to be used to higher operating temperatures than possible with conventional titanium metallic compositions.

An article comprises a microscale composite material having a matrix comprising more titanium by weight than any other element, and a dispersion of titanium boride particles in the matrix. At least about 50 volume percent, more preferably at least about 90 volume percent, and most preferably at least about 99 volume percent, of the intragranular titanium boride particles have a maximum dimension of less than about 2 micrometers. More preferably, at least about 50 volume percent, more preferably at least about 90 volume percent, and most preferably at least about 99 volume percent, of the intragranular titanium boride particles have a maximum dimension of less than about 1 micrometer. More preferably, at least about 50 volume percent, more preferably at least about 90 volume percent, and most preferably at least about 99 volume percent, of the intragranular titanium boride particles have a maximum dimension of less than about 0.5 micrometer. Even more preferably, at least about 50 volume percent, more preferably at least about 90 volume percent, and most preferably at least about 99 volume percent, of the intragranular titanium boride particles have a maximum dimension of less than about 0.2 micrometer.

As used herein in describing the present approach, "titanium boride" refers to TiB, $TiB_2$, $Ti_3B_4$, or other titanium-boron-containing compounds, whose composition may be modified by alloying elements. "Titanium-base" includes pure titanium, metallic alloys of titanium and other elements, and titanium-base intermetallic alloys, as long as there is more titanium by weight than any other element. The "matrix" is the metallic titanium-base material in which the titanium boride particles are distributed and dispersed.

The boron constituent element is preferably present in an amount not greater than that required to form about 90 percent by volume titanium boride in the consolidated material. More preferably, the boron is present in the consolidated material in an amount of not greater than about 17 weight percent of the consolidated material. Even more preferably, the boron is present in the consolidated material in an amount of from about 0.05 to about 17 weight percent of the consolidated material.

The amount of boron present in the material may be considered in two ranges, a hypoeutectic range, which for the titanium-boron binary system is from about 0.05 to about 1.5 percent by weight boron, and a hypereutectic range, which for the titanium-boron binary system is from about 1.5 to about 17 percent by weight boron. Alloys with other elements in addition to titanium and boron may have other phases and ranges, but are within the scope of the present approach. The present approach permits the preparation of materials having the same boron content as may be achieved with other techniques, typically up to about 5 percent by weight of boron, and also the preparation of materials having greater boron content than may be readily achieved with other techniques, typically in the range of from about 5 to about 17 percent by weight of boron. In each case, the materials made by the present approach typically have a fine, uniform titanium boride dispersion.

As stated, boron is preferably present at a level in excess of its room-temperature solid solubility in the titanium-base composition matrix, up to the level required to form no more than about 90 percent by volume titanium boride. For smaller additions in excess of the limit of solid solubility, the fine dispersion of titanium boride particles provides significant high-temperature static strength and high-temperature creep strength benefits by fine-particle strengthening. For larger additions in excess of the limit of solid solubility, there is a larger volume fraction of fine titanium boride particles present and substantial rule-of-mixtures-strengthening benefits in addition to the fine-particle strengthening. At both levels of boron additions in excess of the solid solubility limit, the strength, elastic modulus, and wear resistance of the material are significantly improved over conventional titanium-base compositions.

The matrix is typically polycrystalline, preferably has a grain size of less than about 10 micrometers and more preferably less than about 5 micrometers. The titanium boride particles are preferably formed in situ within the matrix, so that they are never freestanding, freely flowing particles during the preparation of the microscale composite material. The intragranular (i.e., those not at the grain boundaries) titanium boride particles are preferably crystallographically oriented relative to the matrix within each grain, and more preferably are coherent or partially coherent with the matrix within each grain.

The microscale composite material is desirably mechanically within 20 percent of isotropic, more preferably within 10 percent of isotropic. That is, the article may be made by the preferred method so that the mechanical properties may be nearly the same measured in all directions. This state is to be contrasted with the anisotropic mechanical properties usually observed for other titanium-titanium boride materials, in which the rodlike titanium boride particles are aligned with a mechanical working direction, such as the major axis of an extrusion, producing mechanical strength properties that are significantly greater in the working direction than in directions transverse to the working direction. On the other hand, the properties of the present articles may be made anisotropic if desired.

The intragranular titanium boride particles of the present approach are preferably platelike in shape. That is, two dimensions, defining a face of the plate, are relatively large (but not necessarily the same) and one dimension, defining a thickness of the plate, is relatively small. However, the intragranular titanium boride particles need not be platelike, but may instead be equiaxed, rodlike (with one relatively large dimension and two relatively small dimensions), or of another shape.

There may optionally be present an oxide of a stable-oxide-forming additive elements include magnesium, calcium, scandium, yttrium, lanthanum, cerium, praseodymium, neodymium, promethium, samarium, europium, gadolinium, terbium, dysprosium, holmium, erbium, thulium, ytterbium, and lutetium, and mixtures thereof.

The material thus is a titanium-base matrix containing a fine dispersion of titanium boride particles, and optionally with stable-oxide-forming additive element(s) dispersed therethrough. The optional stable-oxide-forming additive element or elements are present in solid solution (either below the solubility limit or in a supersaturated state) and/or as one or more discrete dispersed oxide phases. The dispersed phases may be unoxidized stable-oxide-forming additive elements or an already oxidized dispersion or a mixture of both. The stable-oxide-forming additive elements that are in solid solution or a non-oxidized discrete dispersion are available for subsequent reaction with oxygen that may be in the matrix or diffuses into the metallic material in subsequent processing or service.

The microscale composite material may form the entire article, or may be present as a microscopic or macroscopic insert to another article that is manufactured via any route, including traditional casting and working, casting, or similar approach as described herein. In any of these embodiments where the microscale composite material is added as an insert, the surrounding article may have the same or a different composition.

The formation of the boride dispersion has several important benefits. First, a substantially uniformly distributed fine dispersion aids in achieving the desired mechanical properties, including static strength, fatigue strength, and creep strength, which are stable over extended periods of exposure at elevated temperatures, through dispersion strengthening of the titanium-base matrix. The substantially uniformly distributed dispersion also aids in limiting grain growth of the titanium-base matrix. Second, the modulus of elasticity of the titanium-base composition is significantly increased, allowing the article to withstand substantially higher loads while deforming elastically. Third, the wear resistance and erosion resistance of the article are substantially improved, allowing increased service time in a given application. Fourth, the presence of the fine dispersion results in improved ductility compared with an article prepared by a conventional cast-and-wrought, cast, or gas-atomized or blended-elemental powder metallurgy approach. The boride dispersion may be formed in any titanium-base composition matrix, including alpha, near-alpha, alpha-plus-beta, near-beta, and beta titanium metallic compositions, and any titanium-base intermetallics including those based on the alpha-2, orthorhombic, and gamma titanium aluminides.

The optional oxide dispersion has several important benefits. First, a substantially uniformly distributed dispersion aids in achieving the desired mechanical properties, which are stable over extended periods of exposure at elevated temperature, through further dispersion strengthening of the base-metal matrix, and also aids in limiting grain growth of the base-metal matrix. Second, when the exposure to environmental oxygen occurs during a pre-service oxidation or during service, the oxygen diffusing into the article would normally cause the formation of an "alpha case" near the surface of conventional alpha-phase-containing titanium metallic compositions. In the present approach, the stable-oxide-forming additive elements either in solution or as a separate phase getter the inwardly diffusing oxygen from solid solution and adding to the oxide dispersion, thereby reducing the incidence of alpha case formation and the associated surface embrittlement and possible premature failure. Third, in some cases the oxide dispersoids have a greater volume than the discrete metallic phases from which they were formed. The formation of the oxide dispersoids produces a compressive stress state that is greater near to the surface of the article than deeper in the article. The compressive stress state aids in preventing premature crack formation and growth during service. Fourth, the formation of a stable oxide dispersion at the surface of the article acts as a barrier to the inward diffusion of additional oxygen. Fifth, the removing of excess oxygen in solution from the matrix allows the introduction of higher metallic alloying levels of alpha-stabilizer elements such as aluminum and tin, in turn promoting improved modulus of elasticity, creep strength, and oxidation resistance of the matrix. Sixth, the presence of excess oxygen in solution in some types of titanium metallic compositions, such as alpha-2, orthorhombic, and gamma-based aluminides, reduces the ductility of the titanium metallic composition. The present approach getters that oxygen, so that the ductility is not adversely affected.

A preferred method for producing such an article made of constituent elements in constituent-element proportions includes the steps of furnishing at least one nonmetallic precursor compound, wherein all of the nonmetallic precursor compounds collectively contain the constituent elements in their respective constituent-element proportions. The constituent elements comprise a titanium-base composition, and boron present at a level greater than its room-temperature solid solubility limit in the titanium-base composition. The precursor compounds are chemically reduced to produce a material comprising a titanium-base composition having titanium boride particles therein, without melting the titanium-base composition that forms the matrix. The titanium-base composition does not have a melted microstructure, but instead is more uniform and without the segregation features associated with melting and solidifying. The titanium-base composition having the titanium boride particles therein is consolidated to produce a consolidated article, without melting the titanium-base composition and without melting the consolidated titanium-base composition. The absence of melting aids in achieving and maintaining the fine size distribution of the titanium boride particles. The various steps of this processing are preferably performed at as low a temperature as possible in each case, to avoid coarsening the titanium boride particles and the optional oxide dispersion and/or strong-oxide-former particles. The present approach is compatible with the embodiments discussed herein and those incorporated by reference.

Optionally, the step of furnishing may include the step of furnishing a nonmetallic precursor compound of a stable-oxide-forming additive element that forms a stable oxide in the titanium-base composition. In such a material, at least one additive element is present at a level greater than its room-temperature solid solubility limit in the titanium-base composition. The preferred method includes an additional step, after the step of chemically reducing, of oxidizing the metallic composition, including the oxygen-forming additive element, at a temperature greater than room temperature.

The consolidated article may be mechanically formed as desired, by any mechanical forming technique.

The material may be heat treated either after the chemical reduction step, after the consolidation step (if used), after mechanical forming, or subsequently.

The steps of the preferred approach, the chemical reduction and consolidating steps as well as any other processing steps, are performed at temperatures below the melting point of the matrix and the titanium boride particles, and preferably at as low an elevated temperature as possible and for as short a time as possible at the elevated temperature. The higher the temperature and the longer the time, the coarser will be the titanium boride particles and the optional oxide particles. Process steps are chosen with this limitation in mind. For example, vapor phase chemical reduction is preferred to solid phase chemical reduction, because the vapor phase chemical reduction is typically performed at a lower temperature and/or for a shorter time than is solid phase chemical reduction. Consolidation techniques such as extrusion are preferred to pressing and sintering for the same reason.

The present approach thus provides a titanium-base article having a fine titanium boride dispersion therein, with improved properties and improved stability. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIGS. 6-8 are idealized comparative microstructures illustrating the relative size of titanium boride particles compared to a grid representing the grain size of the matrix, wherein FIG. 6 represents the microstructure for material produced by a gas atomized approach, FIG. 7 represents the microstructure for material produced by a blended elemental approach, and FIG. 8 represents the microstructure for material produced by the present approach.

DETAILED DESCRIPTION OF THE INVENTION

Figure 1:
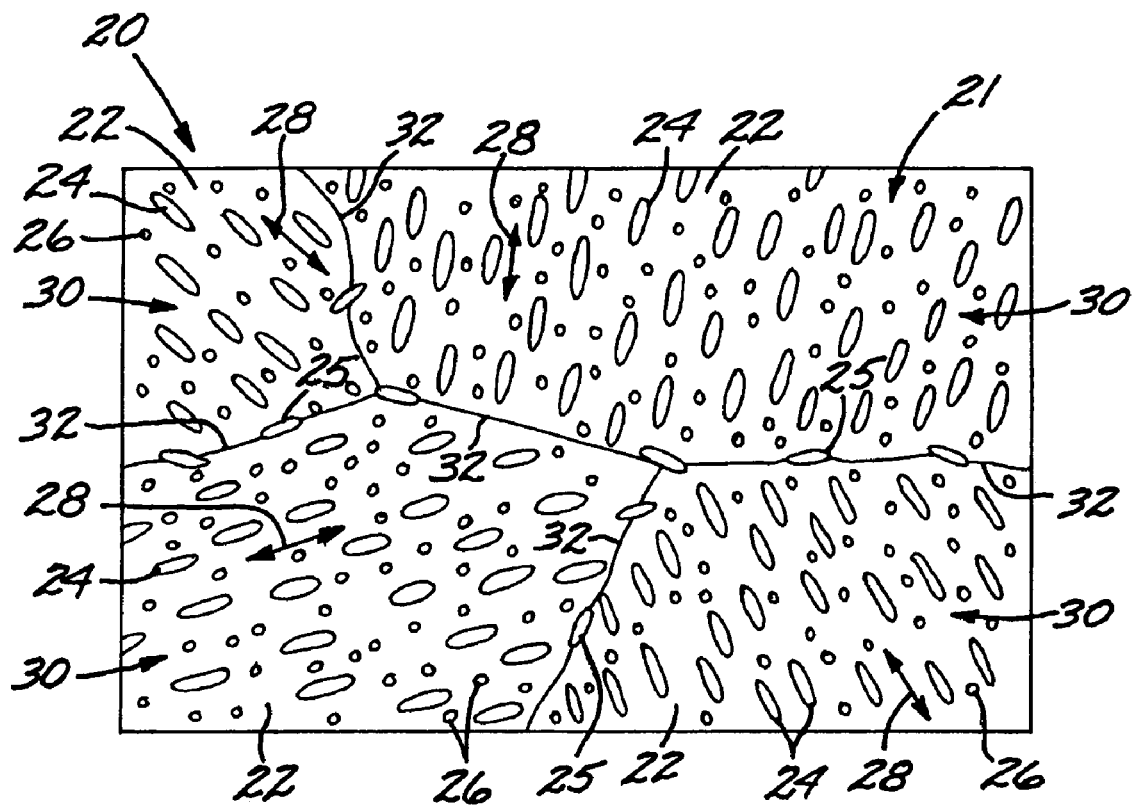
FIG. 1 is an idealized microstructure of the metallic article.

FIG. 1 is an idealized microstructure of an article 20 including a microscale composite 21 formed of a polycrystalline titanium-base matrix 22 having a dispersion of fine platelike intragranular titanium boride particles 24 and grain-boundary titanium boride particles 25 therein. Optionally, there are oxide particles 26 dispersed in the matrix 22 as well. In FIG. 1, the oxide particles 26 are illustrated as smaller in size than the titanium boride particles 24 and 25. However, the oxide particles 26 may be of comparable size with the titanium boride particles 24 and 25, or of larger size than the titanium boride particles 24 and 25. (This idealized microstructure of FIG. 1 does not reflect the relative sizes or volume fractions of the constituents.)

The constituent elements comprise a titanium-base composition, boron, and optionally a stable-oxide-forming additive element. A titanium-base composition has more titanium by weight than any other element (although there may not be more titanium by atomic fraction than any other element, as for example in some gamma-phase titanium aluminides). The titanium-base matrix 22 may be pure titanium (e.g., commercially pure or CP titanium), a metallic alloy of titanium and other elements, or a titanium-base intermetallic alloy. Titanium metallic alloy compositions of particular interest include alpha-beta phase titanium metallic compositions, beta-phase titanium metallic compositions, alpha-2 phase, and orthorhombic phase. A titanium-base intermetallic alloy of particular interest is the gamma-phase titanium aluminide metallic composition. The matrix composition is not limited to these compositions, however.

The matrix 22 is polycrystalline, with portions of four differently oriented grains 30 illustrated, separated by grain boundaries 32. ("Grains" are also sometimes termed "crystals".) The grain size of the grains 30 is preferably less than 10 micrometers, more preferably less than 5 micrometers. The matrix 22 within each of the grains 30 has a crystallographic orientation, represented schematically by arrow 28. The intragranular titanium boride dispersoid particles 24 (i.e., those titanium boride dispersoid particles which are not at the grain boundaries) are preferably crystallographically oriented relative to the crystallographic orientation 28 of the matrix 22 within each grain 30. More preferably, the intragranular titanium boride particles 24 are coherent or partially coherent with the matrix 22 within each grain 30. A coherent interface occurs when lattice planes crossing the interface are continuous, although possibly change orientations. A semi-coherent or partially coherent interface is closely analogous to a low angle boundary in that uniform misfit is related into regions of good, coherent fit separated by regions of bad fit, i.e., dislocations. Coherency is completely lost when the misfit is so large that the interface dislocation spacing is approximately the lattice spacing. The noncoherent interphase boundary is therefore analogous to the high angle grain boundary and occurs when there is no simple fit between the lattices of the two phases. The grain-boundary titanium boride particles 25 are distinct from the intragranular titanium boride particles 24 in respect to preferred orientation, since the orientations of the grain-boundary titanium boride particles 25 may be influenced by the adjoining grains, grain boundary dislocation structures, and the like.

The presence of the preferential orientation of the intragranular titanium boride dispersoid particles 24 relative to the crystallographic direction 28 of the matrix 22 is to be distinguished from the situation found in relation to titanium-titanium boride materials made by other approaches. In the other approaches, the titanium boride particles are typically oriented relative to the working direction, such as a rolling direction or an extrusion direction, rather than in relation to the crystallographic orientation of the matrix. The result is that the mechanical properties of these other materials are typically highly anisotropic after working, with the highest modulus and strength, and lowest ductility, measured parallel to the orientation direction of the titanium boride particles. The present approach leads to a greater degree of isotropy of the titanium boride particles, due to the more nearly random crystallographic orientations of the various grains, when averaged over the entire microscale composite material, and thence the more nearly random orientations of the particles, when averaged over the entire microscale composite material. Desirably, at least one of the mechanical properties of the microscale composite material of the titanium boride particles 24, 25 in the titanium matrix 22 is within 20 percent of isotropic, meaning that its measured values for all measurement directions are within 20 percent of a value averaged over all measurement directions. Preferably, at least one of the mechanical properties of the microscale composite material is within 10 percent of isotropic. However, the properties of the microscale composite material may be made more anisotropic, if desired, by processing treatments such as thermal processing and/or mechanical working.

The boron level ranges from greater than the solubility limit at room temperature of boron in the titanium-base composition to the level required to produce no more than 90 percent by volume titanium boride. Typically, the boron is present in an amount of from 0.05 percent to 17 percent by weight of the total weight of the final consolidated material. The result is a material having at least two phases, including one or more metallic phases constituting the titanium-base matrix 22, the titanium boride particles 24 and 25, and optionally one or more types of stable oxide particles 26. As used herein in describing the present method, "titanium boride" refers to TiB, which is present in most materials made by the present approach, $TiB_2$, which is present where the matrix is a gamma-phase titanium aluminide, $Ti_3B_4$, and/or other titanium borides or other titanium-boron-containing compounds, possibly modified due to the presence of alloying elements. "Titanium monoboride" refers specifically to TiB, and "titanium diboride" refers specifically to $TiB_2$.

It is most preferred that the amount of boron is not less than that required to produce a volume fraction of at least 0.25 volume percent, more preferably at least 0.75 volume percent, even more preferably at least 2 volume percent of titanium boride particles in the matrix. 0.25 volume percent is the amount of 10 nanometer titanium boride particles estimated to yield an increase of 20,000 pounds per square inch in the shear strength of the material; 0.75 volume percent is the amount of 20 nanometer titanium boride particles estimated to yield an increase of 20,000 pounds per square inch in the shear strength of the material; and 2 volume percent is the amount of 30 nanometer titanium boride particles estimated to yield an increase of 30,000 pounds per square inch in the yield strength of the material.

Figure 6:
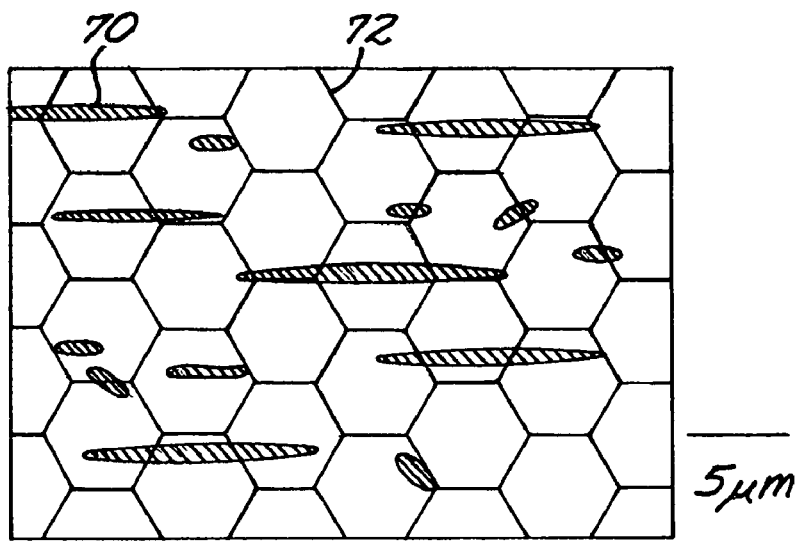
Figure 7:
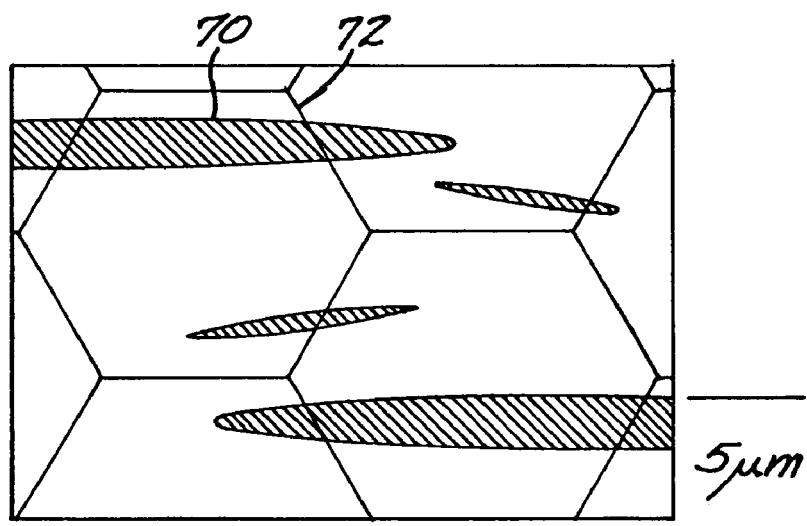
Figure 8:
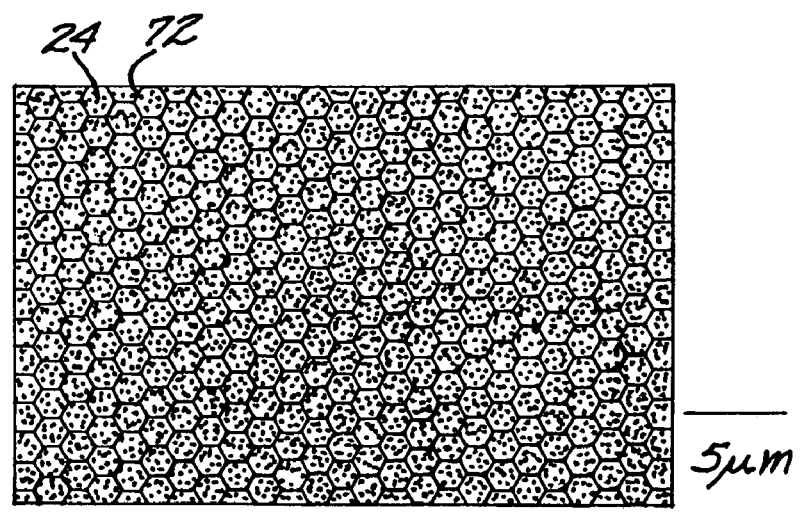

The fine intragranular titanium boride dispersoid particles 24 provides dispersoid (i.e., Orowan) strengthening by interacting with dislocations in the titanium-base composition matrix 22. These fine intragranular dispersoid particles 24 are smaller in size than those produced by prior processes for preparing titanium-titanium boride materials. FIGS. 6-8 are idealized comparative microstructures illustrating the relative size of titanium boride particles 70 compared to a grid 72 representing the grain size of the matrix by two prior approaches (FIG. 6, for a gas atomized approach and FIG. 7 for a blended elemental approach), with the present approach (FIG. 8). With an increasing amount of boron present, the volume fraction of titanium boride increases so that it becomes more nearly continuous at a macroscopic level, but still maintains a separate distribution of fine, less than 1 micrometer, titanium boride on a microscopic level.

Figure 2:
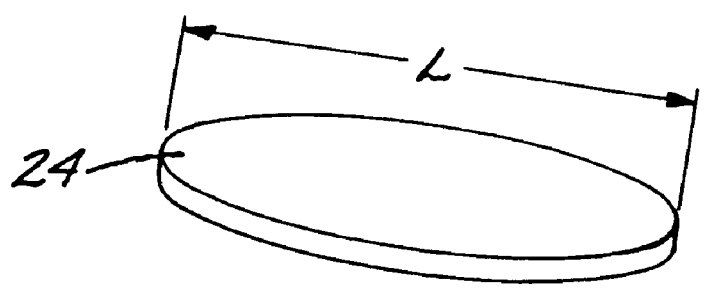
FIG. 2 is a schematic perspective view of a titanium boride particle.

FIG. 2 shows in isolation a single intragranular titanium boride dispersoid particle 24 at an even higher magnification than shown in FIG. 1. The intragranular particle 24 typically has a plate-like shape, with two relatively large dimensions that define the face of the plate and a relatively small dimension that defines the thickness of the plate. The maximum dimension L of one of the two relatively large dimensions of the face of the plate is the maximum dimension of the intragranular titanium boride dispersoid phase particle 24.

In the present approach, at least 50 volume percent, more preferably at least 90 volume percent, and most preferably at least 99 volume percent, of the intragranular titanium boride particles 24 have a maximum dimension L of less than 2 micrometers. More preferably, at least 50 volume percent, more preferably at least 90 volume percent, and most preferably at least 99 volume percent, of the intragranular titanium boride particles 24 have a maximum dimension L of less than 1 micrometer. More preferably, at least 50 volume percent, more preferably at least 90 volume percent, and most preferably at least 99 volume percent, of the intragranular titanium boride particles 24 have a maximum dimension L of less than 0.5 micrometer. Even more preferably, at least 50 volume percent, more preferably at least 90 volume percent, and most preferably at least 99 volume percent, of the intragranular titanium boride particles 24 have a maximum dimension L of less than 0.2 micrometer.

The optional oxide particles 26 are formed by the reaction of oxygen with one or more stable-oxide-forming additive elements. An element is considered to be a stable-oxide-forming additive element if it forms a stable oxide in a titanium-base composition, where the titanium-base composition either has substantially no oxygen in solid solution or where the titanium-base composition has a small amount of oxygen in solid solution. As much as about 0.5 weight percent oxygen in solid solution may be required for the stable-oxide-forming additive element to function as an effective stable-oxide former. Thus, preferably, the titanium-base composition has from zero to about 0.5 weight percent oxygen in solid solution. Larger amounts of oxygen may be present, but such larger amounts may have an adverse effect on ductility. In general, oxygen may be present in a material either in solid solution or as a discrete oxide phase such as the oxides formed by the stable-oxide-forming additive elements when they react with oxygen.

Titanium has a strong affinity for and is highly reactive with oxygen, so that it dissolves many oxides, including its own. The stable-oxide-forming additive elements within the scope of the present approach form a stable oxide that is not dissolved by the titanium metallic composition matrix during typical thermal conditions associated with reduction, consolidation, heat treat, and exposure. Examples of stable-oxide-forming additive elements are strong oxide-formers such as magnesium, calcium, scandium, and yttrium, and rare earths such as lanthanum, cerium, praseodymium, neodymium, promethium, samarium, europium, gadolinium, terbium, dysprosium, holmium, erbium, thulium, ytterbium, and lutetium, and mixtures thereof.

The presence and the nature of the distribution of the oxide particles 26 has several additional important consequences. The dispersion of oxide particles 26 serve to strengthen the matrix 22 by the dispersion-strengthening effect and also to improve the elevated-temperature creep strength of the matrix 22. The dispersion of oxide particles 26 may also pin the grain boundaries 32 of the matrix 22 to inhibit coarsening of the grains 30 during processing and/or elevated temperature exposure. Additionally, in some circumstances the oxide particles 26 have a higher specific volume than the stable oxide-forming additive elements from which they are produced. This higher specific volume creates a compressive force in the matrix 22 near its surface. The compressive force inhibits crack formation and growth when the article is loaded in tension or torsion during service, a highly beneficial result.

Figure 3:
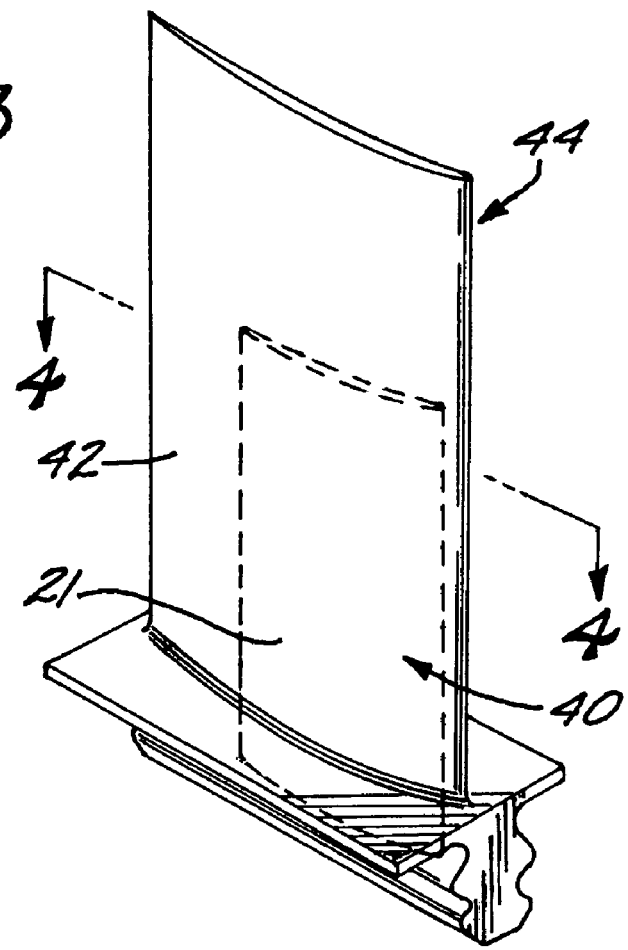
FIG. 3 is a perspective view of a gas turbine component made by the present approach and having a titanium-boron insert.
Figure 4:
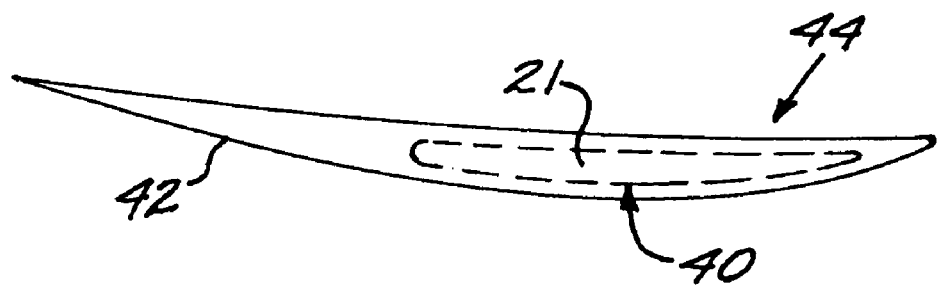
FIG. 4 is a sectional view of the gas turbine component of FIG. 3, taken on line 4-4.

One important utilization of the present approach is that the consolidated article may form an insert in relation to a mass of different material. In the embodiment of FIGS. 3-4, an insert 40 of the microscale composite 21 as discussed above is placed into the non-composite metallic alloy material that forms the balance of an airfoil 42 of a gas turbine blade 44. The insert increases the strength and modulus of the airfoil 42, without being exposed to the environmental gases and without altering the shape of the airfoil 42. Inserts may be incorporated by any operable approach, such as by making the non-boride portion by casting in place, casting and working, or a nonmelting approach.

Other examples of articles that may be made by the present approach include components of gas turbine engines include vanes, disks, blisks, blings, shafts, cases, engine mounts, seals, and housings. Other articles include, for example, airframe components, automotive parts, and biomedical articles. The use of the present invention is not limited to these particular articles, however.

Figure 5:
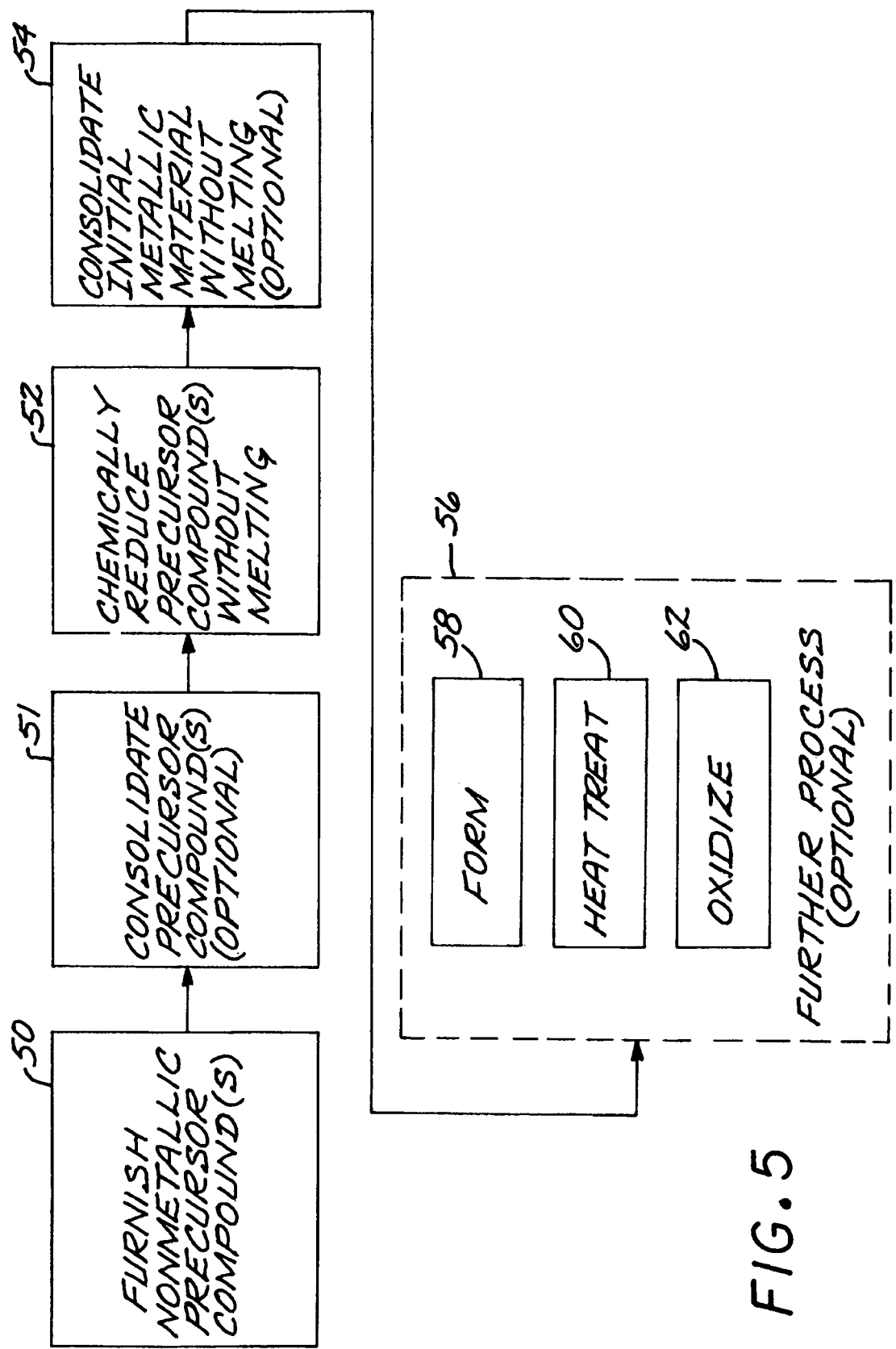
FIG. 5 is a block flow diagram of an approach for practicing the invention.

FIG. 5 depicts a preferred method for producing a metallic article made of constituent elements in constituent-element proportions. At least one nonmetallic precursor compound is furnished, step 50. All of the nonmetallic precursor compounds collectively contain the constituent elements in their respective constituent-element proportions. The metallic elements may be supplied by the precursor compounds in any operable way. In the preferred approach, there is exactly one non-oxide precursor compound for each metallic alloying element, and that one precursor compound provides all of the material for that respective metallic constituent in the metallic composition. For example, for a four-element metallic material that is the final result of the process, a first precursor compound supplies all of the first element, a second precursor compound supplies all of the second element, a third precursor compound supplies all of the third element, and a fourth precursor compound supplies all of the fourth element. Alternatives are within the scope of the approach, however. For example, several of the precursor compounds may together supply all of one particular metallic element. In another alternative, one precursor compound may supply all or part of two or more of the metallic elements. The latter approaches are less preferred, because they make more difficult the precise determination of the elemental proportions in the final metallic material. The final metallic material is typically not a stoichiometric compound having relative amounts of the metallic constituents that may be expressed as small integers.

The precursor compounds are nonmetallic and are selected to be operable in the reduction process in which they are reduced to metallic form. In one reduction process of interest, vapor-phase reduction, the precursor compounds are preferably metal halides. In another reduction process of interest, solid-phase reduction, the precursor compounds are preferably metal oxides. Mixtures of different types of precursor compounds may be used.

Some constituents, termed "other additive constituents", may be difficult to introduce into the metallic composition. Whatever the reduction technique used in step 52 and however the other additive constituent is introduced, the result is a mixture that comprises the metallic composition. Methods for introducing other additive constituents may be performed on precursors prior to the reduction of the base-metal constituent, or on already-reduced material. For example, boron may be added using borane gas, or yttrium may be added as yttrium chloride.

The chemical composition of the initial metallic composition is determined by the types and amounts of the metals in the mixture of nonmetallic precursor compounds furnished in step 50 or that are introduced in the processing. The relative proportions of the metallic elements are determined by their respective ratios in the mixture of step 50 (not by the respective ratios of the compounds, but the respective ratios of the metallic elements). The initial metallic composition has more titanium than any other metallic element in the precursor compounds, producing a titanium-base initial metallic composition.

Optionally, the nonmetallic precursor compounds may be pre-consolidated, step 51, prior to chemical reduction by techniques such as solid-phase reduction. The pre-consolidation leads to the production of a sponge in the subsequent processing, rather than particles. The pre-consolidation step 51, when used, is performed by any operable approach, such as pressing the nonmetallic precursor compounds into a pre-consolidated mass.

The single nonmetallic precursor compound or the mixture of nonmetallic precursor compounds is chemically reduced to produce metallic particles or sponge, without melting the precursor compounds or the metal, step 52. As used herein, "without melting", "no melting", and related concepts mean that the material is not macroscopically or grossly melted for an extended period of time, so that it liquefies and loses its shape. There may be, for example, some minor amount of localized melting as low-melting-point elements melt and are diffusionally alloyed with the higher-melting-point elements that do not melt, or very brief melting for less than 10 seconds. Even in such cases, the gross shape of the material remains unchanged.

In one preferred reduction approach, termed vapor-phase reduction because the nonmetallic precursor compounds are furnished as vapors or gaseous phases, the chemical reduction may be performed by reducing mixtures of halides of the base metal and the metallic alloying elements using a liquid alkali metal or a liquid alkaline earth metal. For example, titanium tetrachloride, borane trichloride, and the halides of the metallic alloying elements are provided as gases. A mixture of these gases in appropriate amounts is contacted to molten sodium, so that the metallic halides are reduced to the metallic form. The metallic composition is separated from the sodium. This reduction is performed at temperatures below the melting point of the metallic composition. The approach, but without the present invention, is described more fully in U.S. Pat. Nos. 5,779,761 and 5,958,106, and U.S. Patent Publication 2004/0123700, all of whose disclosures are incorporated by reference. Other gas-phase techniques are described in U.S. Publications 2004/0050208 and 2004/0261573, whose disclosures are incorporated by reference.

Reduction at lower temperatures rather than higher temperatures is preferred. Desirably, the reduction is performed at temperatures of 600° C. or lower, and preferably 500° C. or lower. By comparison, prior approaches for preparing titanium- and other metallic compositions often reach temperatures of 900° C. or greater. The lower-temperature reduction is more controllable, and also is less subject to the introduction of contamination into the metallic composition, which contamination in turn may lead to chemical irregularities. Additionally, the lower temperatures reduce the incidence of sintering together of the particles during the reduction step and limits the potential coarsening of the stable boride and optional oxide dispersions.

In another reduction approach, termed solid-phase reduction because the nonmetallic precursor compounds are furnished as solids, the chemical reduction may be performed by fused salt electrolysis. Fused salt electrolysis is a known technique that is described, for example, in published patent application WO 99/64638, whose disclosure is incorporated by reference in its entirety. Briefly, in this variation of in fused salt electrolysis the mixture of nonmetallic precursor compounds, furnished in a finely divided solid form, is immersed in an electrolysis cell in a fused salt electrolyte such as a chloride salt at a temperature below the melting temperature of the metallic composition that forms from the nonmetallic precursor compounds. The mixture of nonmetallic precursor compounds is made the cathode of the electrolysis cell, with an inert anode. The elements combined with the metals in the nonmetallic precursor compounds, such as oxygen in the preferred case of oxide nonmetallic precursor compounds, are partially or completely removed from the mixture by chemical reduction (i.e., the reverse of chemical oxidation). The reaction is performed at an elevated temperature to accelerate the diffusion of the oxygen or other gas away from the cathode. The cathodic potential is controlled to ensure that the reduction of the nonmetallic precursor compounds will occur, rather than other possible chemical reactions such as the decomposition of the molten salt. The electrolyte is a salt, preferably a salt that is more stable than the equivalent salt of the metals being refined and ideally very stable to remove the oxygen or other gas to a desired low level. The chlorides and mixtures of chlorides of barium, calcium, cesium, lithium, strontium, and yttrium are preferred. The chemical reduction is preferably, but not necessarily, carried to completion, so that the nonmetallic precursor compounds are completely reduced. Not carrying the process to completion is a method to control the oxygen content of the metal produced and to allow subsequent formation of the oxide dispersion. If the pre-consolidation step 51 is performed, the result of this step 52 may be a metallic sponge.

In another reduction approach, termed "rapid plasma quench" reduction, the precursor compound such as titanium chloride is dissociated in a plasma arc at a temperature of over 4500° C. The precursor compound is rapidly heated, dissociated, and quenched in hydrogen gas. The result is fine metallic-hydride particles. Any melting of the metallic particles is very brief, on the order of 10 seconds or less, and is within the scope of "without melting" and the like as used herein. The hydrogen is subsequently removed from the metallic-hydride particles by a vacuum heat treatment. Oxygen may also be added to react with the stable-oxide-forming additive elements to form the stable oxide dispersion. Boron is added to react with titanium to produce a titanium boride.

Whatever the reduction technique used in step 52, the result is a material of a metallic titanium-base composition, titanium boride, and optionally stable oxide particles. The material may be free-flowing particles in some circumstances, or have a sponge-like structure in other cases. The sponge-like structure is produced in the solid-phase reduction approach if the precursor compounds have first been pre-compacted together (i.e., optional step 51) prior to the commencement of the actual chemical reduction. The precursor compounds may be compressed to form a compressed mass that is larger in dimensions than a desired final metallic article.

Optionally but preferably, the material is consolidated to produce a consolidated metallic article, step 54, without melting the titanium-base composition and without melting the consolidated titanium-base composition. The consolidation step 54 may be performed by any operable technique, with examples being hot isostatic pressing, forging, extrusion, pressing and sintering, and direct powder consolidation extrusion or rolling, or a combination of these methods.

Optionally but preferably, there is further processing, step 56, of the consolidated metallic article. In this processing, the article is not melted. Such further processing may include, for example, mechanically forming the consolidated metallic article, step 58, by any operable approach, and/or heat treating the consolidated metallic article, step 60, by any operable approach, and/or oxidizing the consolidated metallic article, step 62, by any operable approach (where there are stable oxide-forming elements present that need to be reacted to form the oxide particles 26). These steps 58, 60, and/or 62, where used, are selected according to the nature of the titanium-base composition. However, these steps 58, 60, 62 are preferably performed at as low a temperature as possible to avoid excessive coarsening of the titanium boride particles 24 and 25.

The present approach has been practiced by preparing powders having compositions of titanium-about 0.8 weight percent boron-about 0.5 weight percent oxygen and titanium-about 2 weight percent boron-about 1 weight percent oxygen, using the preferred approach described above. Some powders were consolidated by hot isostatically pressing (HIP). Other powders were consolidated by HIP followed by extruding with an extrusion ratio of about 10:1. Some samples were stress relieved following consolidation.

Specimens were examined by X-ray diffraction, scanning electron microscopy, and transmission electron microscopy. The X-ray diffraction identified the presence of alpha titanium and TiB. The scanning electron microscopy and transmission electron microscopy indicated the presence of a uniform fine distribution of sub-micron titanium boride particles, ranging in maximum dimension from less than 100 nanometers to several hundred nanometers. The intragranular titanium boride particles exhibited interfaces that were faceted with the adjacent matrix of alpha-phase titanium. The major zone axes of the TiB particles were aligned with the major zone axes of the adjacent alpha ($\alpha$)-phase titanium matrix. In this material, [11-20]$\alpha$ was parallel to [010] intragranular TiB, (0001)$\alpha$ was parallel to (001) intragranular TiB, and (−1100)$\alpha$ was parallel to (001) intragranular TiB. However, different relations may be found in other compositions.

The particles were plate-shaped and of similar shape, size, and orientation in both the as-HIP and HIP+extrude materials. Macrohardness measurements were conducted on both as-HIP and HIP+extruded materials. The materials were largely isotropic in both states, indicating that the extrusion did not produce a significant anisotropy in the hardness mechanical property.

Specimens were also prepared with titanium boride particles dispersed in a nominal Ti-6Al-4V matrix.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An article comprising a microscale composite material having
    a matrix comprising more titanium by weight than any other element; and
    a dispersion of titanium boride particles in the matrix, wherein at least about 50 volume percent of the titanium boride particles have a maximum dimension of less than about 2 micrometers, wherein the microscale composite material is mechanically within 20 percent of isotropic.

2. The article of claim 1, wherein the microscale composite material has less than about 1.5 percent by weight boron.

3. The article of claim 1, wherein the microscale composite material has from about 1.5 percent by weight boron to about 17 weight percent boron.

4. The article of claim 1, wherein the matrix is polycrystalline.

5. The article of claim 1, wherein the matrix is polycrystalline with a grain size of less than about 10 micrometers.

6. The article of claim 1, wherein the matrix is polycrystalline with a grain size of less than about 5 micrometers.

7. The article of claim 1, wherein the matrix is polycrystalline, wherein the titanium boride particles include intragranular titanium boride particles, and wherein the intragranular titanium boride particles are crystallographically preferentially oriented relative to the matrix within each grain.

8. The article of claim 1, wherein the matrix is polycrystalline, wherein the titanium boride particles include intragranular titanium boride particles, and wherein the intragranular titanium boride particles within each grain are coherent or partially coherent with the matrix of said grain.

9. The article of claim 1, wherein at least about 50 volume percent of the titanium boride particles have a maximum dimension of less than about 1 micrometer.

10. The article of claim 1, wherein at least about 50 volume percent of the titanium boride particles have a maximum dimension of less than about 0.5 micrometer.

11. The article of claim 1, wherein at least about 50 percent of the titanium boride particles have a maximum dimension of less than about 0.2 micrometer.

12. The article of claim 1, wherein the titanium boride particles are plate-shaped.

13. The article of claim 1, wherein the article includes the microscale composite material as an insert in another material.

14. The article of claim 1, wherein the microscale composite material further includes
    a dispersion of particles other than titanium boride particles.

15. The article of claim 1, wherein the microscale composite material further includes
    a dispersion of oxide particles.

16. An article comprising a microscale composite material having
    a matrix comprising more titanium by weight than any other element; and
    a dispersion of intragranular titanium boride particles in the matrix, wherein the intragranular titanium boride particles and the matrix have a preferred crystallographic orientation therebetween;
    wherein the microscale composite material has at least one mechanical property within 20 percent of isotropic.

17. The article of claim 1, wherein the matrix is an alpha-beta phase titanium metallic composition or a beta-phase titanium metallic composition.

18. The article of claim 1, wherein the matrix is a titanium-base intermetallic composition.

19. An article comprising a microscale composite material having
- a matrix comprising more titanium by weight than any other element, wherein the matrix is polycrystalline with a grain size of less than about 10 micrometers; and
- a dispersion of titanium boride particles in the matrix, wherein at least about 50 volume percent of the titanium boride particles have a maximum dimension of less than about 2 micrometers.

20. The article of claim 19, wherein the microscale composite material has less than about 1.5 percent by weight boron.

21. The article of claim 19, wherein the microscale composite material has from about 1.5 percent by weight boron to about 17 weight percent boron.

22. The article of claim 19, wherein the matrix has a grain size of less than about 5 micrometers.

23. The article of claim 19, wherein the titanium boride particles include intragranular titanium boride particles, and wherein the intragranular titanium boride particles are crystallographically preferentially oriented relative to the matrix within each grain.

24. The article of claim 19, wherein the titanium boride particles include intragranular titanium boride particles, and wherein the intragranular titanium boride particles within each grain are coherent or partially coherent with the matrix of said grain.

25. The article of claim 19, wherein the microscale composition material further includes
a dispersion of particles other than titanium boride particles.

26. The article of claim 19, wherein the microscale composite material further includes
a dispersion of oxide particles.

27. The article of claim 19, wherein the matrix is an alpha-beta phase titanium metallic composition or a beta-phase titanium metallic composition.

28. The article of claim 19, wherein the matrix is a titanium-base intermetallic composition.

29. An article comprising a microscale composite material having
- a matrix comprising more titanium by weight than any other element; and
- a dispersion of titanium boride particles in the matrix, wherein at least about 50 volume percent of the titanium boride particles have a maximum dimension of less than about 2 micrometers, wherein the matrix is polycrystalline, wherein the titanium boride particles include intragranular titanium boride particles, and wherein the intragranular titanium boride particles within each grain are coherent or partially coherent with the matrix of said grain.

30. The article of claim 29, wherein the microscale composite material has less than about 1.5 percent by weight boron.

31. The article of claim 29, wherein the microscale composite material has from about 1.5 percent by weight boron to about 17 weight percent boron.

* * * * *